United States Patent

Steigenberger et al.

[11] Patent Number: 6,072,363
[45] Date of Patent: Jun. 6, 2000

[54] FACILITY FOR COMBINING AND AMPLIFYING TWO BROADBAND SIGNALS

[75] Inventors: Ulrich Steigenberger, Stuttgart; Volker Hagele, Rudersberg, both of Germany

[73] Assignee: Alcatel, Paris, France

[21] Appl. No.: 09/179,413

[22] Filed: Oct. 27, 1998

[30] Foreign Application Priority Data

Oct. 28, 1997 [DE] Germany .......................... 197 47 447

[51] Int. Cl.$^7$ ...................................... H03F 3/68
[52] U.S. Cl. .................... 330/126; 330/124 R; 370/297; 333/126; 455/116
[58] Field of Search .................. 330/124 R, 84, 330/126, 150, 302, 306; 370/297, 480, 343; 333/126, 129, 132, 134; 455/116, 103

[56] References Cited

U.S. PATENT DOCUMENTS

| | | |
|---|---|---|
| 4,238,766 | 12/1980 | Masuda . |
| 5,032,804 | 7/1991 | Hollingsworth . |
| 5,528,581 | 6/1996 | De Bot . |
| 5,659,891 | 8/1997 | Hays et al. ............... 455/103 |
| 5,793,506 | 8/1998 | Schmid . |
| 5,809,420 | 9/1998 | Ichiyanagi et al. .......... 455/103 |
| 5,862,457 | 1/1999 | Winters .................... 455/103 |
| 5,956,345 | 9/1999 | Allpress et al. ............ 370/480 |

FOREIGN PATENT DOCUMENTS

| | | |
|---|---|---|
| 36 26 862 A1 | 2/1988 | Germany . |
| 39 02 746 A1 | 8/1990 | Germany . |
| 44 36 818 C1 | 10/1995 | Germany . |

OTHER PUBLICATIONS

Koch, Egon: Die Probleme bei Mehrbereichs–Ver–stärkern. In: Funkschau 1971, H. 4, 43.Jg., S. 111–113, No month.
Bambach, Wolfgang, u. a.: Diamant. Ein Modulares, digitables Glasfaser–Anschlußsystem für distributive und interaktive Dienste. Taschenbuch dre telekom praxis, 1994, S. 150–171, No month.

Primary Examiner—Robert Pascal
Assistant Examiner—Henry Choe
Attorney, Agent, or Firm—Sughrue, Mion, Zinn, Macpeak & Seas, PLLC

[57] ABSTRACT

A facility (VOR) is disclosed for combining and amplifying two broadband signals which are received from different transmission networks (NET1, NET2) and are transmitted in transmission channels separated in frequency. The facility (VOR) contains a broadband amplifier (BV), a preamplifier (VV), and a frequency filter unit (FW). The preamplifier (VV) and the frequency filter unit (FW) condition the signals to be amplified and establish an optimized signal-to-noise ratio between the two combined broadband signals: The preamplifier adapts the level of one of the signals to the level of the other signal, e.g., to the same value, whereby a linear and increased amplification is achieved in the broadband amplifier, and the filtering of the signals in the frequency filter unit prevents interfering signals, e.g., noise, contained in said one signal from getting into the frequency band occupied by the other signal and vice versa when the two signals are combined.

8 Claims, 2 Drawing Sheets

FACILITY FOR COMBINING AND AMPLIFYING TWO BROADBAND SIGNALS

BACKGROUND OF THE INVENTION

1. Field of the Invention

This invention relates to a facility for combining and amplifying two broadband signals as set forth in the preamble of claim 1.

2. Description of the Related Art

DE 44 36 818 discloses a facility for combining and amplifying two broadband signals. One of the broadband signals contains analog cable television signals which are transmitted in a coaxial cable network. The other broadband signal contains digital bidirectional signals which are transmitted in a fiber optic network that is to be installed in addition to the existing coaxial cable network. In the facility, the received cable television signals are amplified in a unidirectional amplifier; the received digital bidirectional signals are converted from optical to electrical form and are then amplified in a bidirectional amplifier. The amplified cable television signals and the amplified bidirectional signals are then combined by means of a coupling device. Cable television signals and bidirectional signals are transmitted in different frequency bands, so that the coupling device can be implemented with frequency-selective circuits. Two amplifiers are thus necessary in the facility, which together have high power dissipation. The facility is remotely fed over the existing cable television network with power limited in value, so that a power dissipation increased by the additional bidirectional amplifier is disadvantageous and may require a new remote power feeding concept.

DE 195 05 578 discloses an optical transmission system for transmitting cable television signals as well as video and telecommunications signals. The cable television signals are transmitted in a first optical transmission network from a center to a network termination. The video and telecommunications signals are transmitted from the center to the network termination in a second optical transmission network. In the network termination, the cable television signals and the video signals, after being separately converted from optical to electrical form, are fed unattenuated to a broadband amplifier and are amplified together. The telecommunications signals are first converted from optical to electrical form together with the video signals, then separated from the video signals, attenuated, and amplified in a narrow-band amplifier. Cable television signals, video signals, and telecommunications signals are transmitted in different frequency bands. The joint amplification of cable television signals and video signals saves one amplifier, but the two signals come from different networks, which may result in mutual interference when the signals are combined.

SUMMARY OF THE INVENTION

It is therefore an object of the invention to provide a facility which is suitable for combining and amplifying two broadband signals that are received from different transmission networks and are transmitted in transmission channels separated in frequency.

This object is attained by the facility according to claim 1. The facility is characterized in that it comprises a preamplifier and a frequency filter unit which condition the signals to be amplified and optimize the signal-to-noise ratio between the two combined broadband signals: The preamplifier adapts the level of one of the signals to the level of the other signal, e.g., to the same value, whereby a linear and increased amplification is achieved in the broadband amplifier, and the filtering of the signals in the frequency filter unit prevents interfering signals, e.g., noise, contained in said one signal from getting into the frequency band occupied by the other signal and vice versa when the two signals are combined.

Further advantageous features of the invention are defined in the dependent claims.

BRIEF DESCRIPTION OF THE DRAWINGS

The invention will become more apparent from the following description of three embodiments take in conjunction with the accompanying drawings, in which.

DESCRIPTION OF THE PREFERRED EMBODIMENTS

Figure 1:
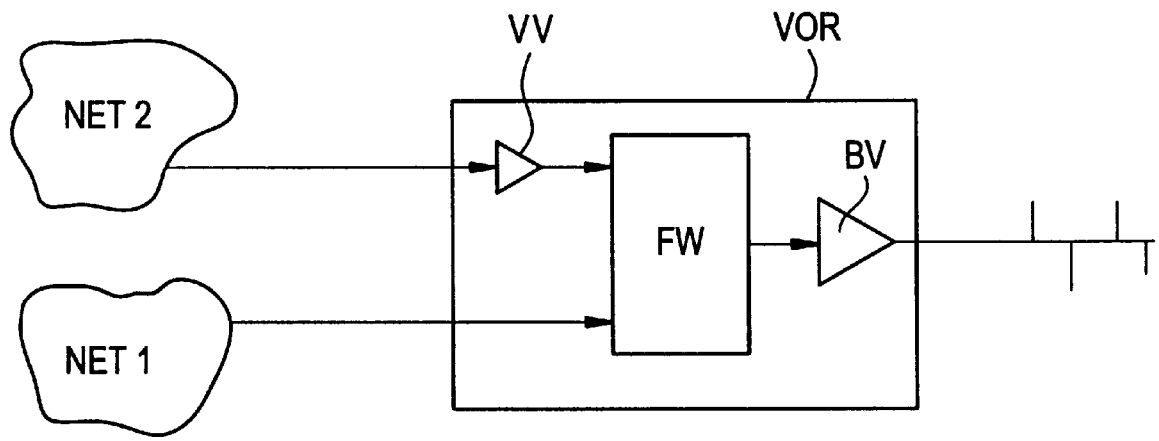
FIG. 1 is a schematic block diagram of a first embodiment of a facility in accordance with the invention and its connection to two transmission networks.

FIG. 1 shows a facility VOR in accordance with the invention and two transmission networks NET1 and NET2. The transmission network NET1 is a network for transmitting broadband signals, such as analog cable television signals. The cable television signals are transmitted electrically over coaxial cables or optically over fiber optic cables in a frequency band of 80 MHz to 450 MHz. The structure of the transmission network NET1 corresponds, for example, to that of a tree network. The cable television signals are then distributed from a center over a branching coaxial cable or fiber optic network to a plurality of terminals. At certain intervals, the cable television signals must be amplified; to this end, electrical or optical repeaters are inserted in the signal path. Part of the cable television signals are routed to the facility VOR. If the cable television signals are fed to the facility VOR in optical form, the facility VOR will include an optical-to-electrical converter for converting the cable television signals to electric signals before they are further processed. If the cable television signals are fed to the facility VOR in electrical form, the facility VOR will include a power filter which couples out part of the power transmitted over the coaxial cables and thus supplies the facility with power limited in value.

The transmission network NET2 is a network for transmitting broadband signals, such as analog and/or digital cable television signals and/or digital video signals. The cable television signals and/or video signals are transmitted optically over fiber optic cables in a frequency band of 470 MHz to 860 MHz. The structure of the transmission network NET1 corresponds, for example, to that of a tree network. The cable television signals and/or video signals are then transmitted from a center over a fiber optic network comprising optical splitters to a plurality of terminals. At certain intervals, the cable television signals and/or video signals must be amplified; to this end, optical repeaters are inserted in the signal path. Part of the cable television signals and/or video signals are routed to the facility VOR. In the facility VOR, an optical-to-electrical converter is provided for converting the cable television signals and/or video signals into electric signals before they are further processed.

The function of the facility VOR is to combine and amplify the two broadband signals which are transmitted in transmission networks NET1 and NET2 in channels separated in frequency. To accomplish this, the facility VOR contains a frequency filter unit FW, a broadband amplifier BV, and a preamplifier VV which, after the broadband signals from the transmission network NET2 have been converted from optical to electrical form, amplifies these signals such that the ratio of the level of the broadband signal received transmission network NET2 to the level of the broadband signal received from transmission network NET1 has a predetermined value. The level of the broadband signal from transmission network NET1 is, for example, 76 dB. The level of the broadband signal from transmission network NET2 is also set at, for example, 76 dB by the preamplifier VV. The levels of the two received signals are thus adapted to one another, which has favorable effects on the subsequent amplification, since, if an amplifier has a gain characteristic which is constant over frequency, two signals with the same level will be amplified more uniformly, so that the dynamic range of the amplifier can be optimally utilized. With a gain characteristic which is not constant over frequency, the uniformity of amplification can be improved by an appropriate choice of the preamplification factor. The preamplifier VV is a simple and low-cost device, since it only needs to amplify in the 470–860 MHz band and its gain is very low; the broadband signals received from transmission network NET2 already have a level of, e.g., 74 dB, so that only 2 dB gain needs to be provided.

The frequency filter unit FW has two inputs and one output. One of the inputs receives the broadband signals from transmission network NET1 direct, in the optical case after optical-to-electrical conversion, and the other input receives the broadband signals from transmission network NET2 after their level adaptation. The frequency filter unit FW combines the two input signals, and its output is applied to the subsequent broadband amplifier BV. The broadband signal from transmission network NET2 occupies a frequency band above a predetermined cutoff frequency, e.g., 470 MHz. The broadband signal from transmission network NET1 occupies a frequency band below a predetermined cutoff frequency, e.g., 450 MHz. The frequency filter unit FW is designed to minimize the transfer of interference from one of the broadband signals to the frequency band occupied by the other broadband signal and vice versa. To accomplish this, a high-pass filter and a low-pass filter are provided. The high-pass filter has a cutoff frequency of 460 Mhz, i.e., it passes only signals above the cutoff frequency and blocks signals below the cutoff frequency. The high-pass filter follows that input of the frequency filter unit FW to which the broadband signal from transmission network NET2 is applied. In this manner, an interfering signal in the signal from transmission network NET2 which has a frequency below 460 MHz and, during the combination of the signals from the two transmission networks NET1 and NET2, would reduce the signal-to-noise ratio in the signal from transmission network NET1 is eliminated. The low-pass filter has a cutoff frequency of 460 MHz, i.e., it passes only signals below the cutoff frequency and blocks signals above the cutoff frequency. It follows that input of the frequency filter unit FW to which the broadband signal from transmission network NET1 is applied. In this manner, an interfering signal in the signal from transmission network NET1 which has a frequency above 460 MHz and, during the combination of the signals from the two transmission networks NET1 and NET2, would reduce the signal-to-noise ratio in the signal from transmission network NET2 is eliminated.

The broadband amplifier BV following the frequency filter unit FW amplifies the combined broadband signals, which are then routed to a group of terminals. The broadband amplifier BV is suitable for amplifying signals at least in the range of 80 to 860 MHz. As a result of the conditioning of the signals by the preamplier VV and the frequency filter unit FW, the broadband amplifier BV can be of lower quality and, thus, less complex than if no conditioning takes place, so that a higher quality is attainable at the same cost or a cost saving is provided for the same quality.

Figure 2:
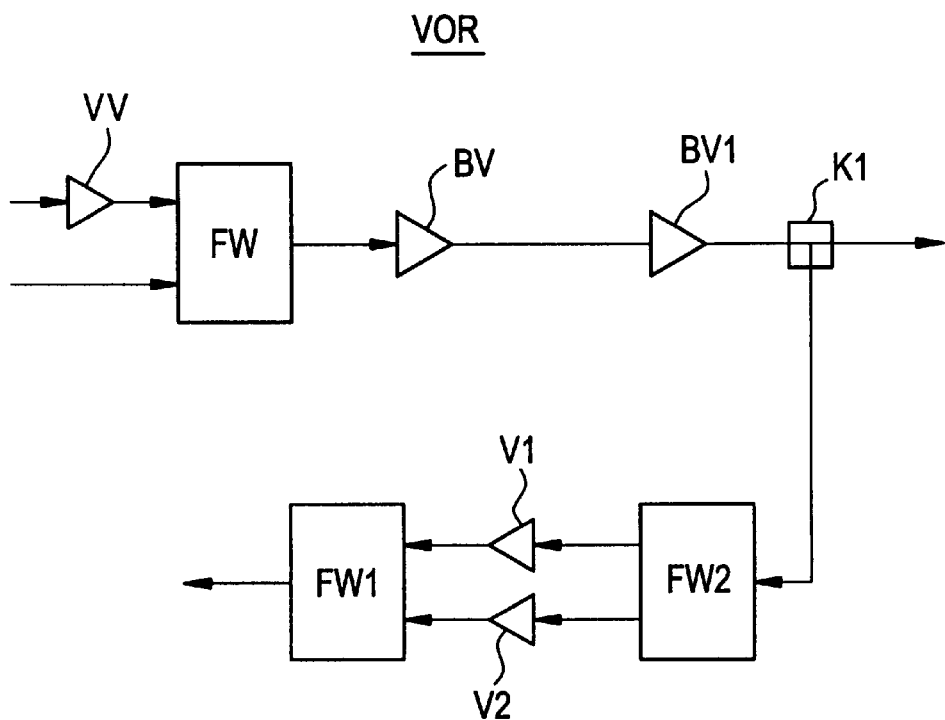
FIG. 2 is a schematic block diagram of a second embodiment of a facility in accordance with the invention.

The second embodiment will now be described with reference to FIG. 2. FIG. 2 shows a facility VOR according to the invention which, like the facility of FIG. 1, comprises a preamplifier VV, a frequency filter unit FW, and a broadband amplifier BV. These elements are identical in operation and construction to those of FIG. 1.

The facility of FIG. 2 further includes a second broadband amplifier BV1, an asymmetrical directional coupler K1, two further frequency filter units FW1, FW2, and two amplifiers V1, V2.

The broadband amplifier BV1 follows the broadband amplifier BV and serves to further raise the output level of the broadband amplifier BV, so that the signal is transmissible over long distances without further amplification. The broadband amplifier BV1 is followed by the asymmetrical directional coupler K1, which serves to route a major portion, e.g., 80%, of the output of the broadband amplifier BV1 to a group of terminals, and a small portion, e.g., 20%, to the frequency filter unit FW2.

The frequency filter unit FW2 has one input and two outputs and serves to generate two signals with different, nonoverlapping frequency bands from the applied portion of the output of the broadband amplifier BV. To accomplish this, the frequency filter unit FW2 contains, for example, a high-pass filter and a low-pass filter. The operation of the frequency filter unit FW2 is comparable to that of the frequency filter unit FW of FIG. 1. The cutoff frequencies of the high-pass and low-pass filters are adjustable. They may be chosen to be 460 MHz, for example, thus corresponding to the cutoff frequencies of the high-pass and low-pass filters of the frequency filter unit FW of FIG. 1. In this manner, the received, combined, and amplified signals are separated again and can be amplified in the amplifiers V1, V2 with different gains. The signals from transmission network NET1 are, for example, analog signals, whose levels must meet different requirements from those placed on the signals from transmission network NET2, which are digital signals, for example. However, the cutoff frequencies of the high-pass and low pass filters may also be chosen to be different from the cutoff frequencies of the high-pass and low-pass filters of the frequency filter unit FW of FIG. 1. If, for example, exclusively analog signals are transmitted in transmission network NET1, and both analog and digital signals are transmitted in transmission network NET2, the analog signals from transmission networks NET1 and NET2 and the digital signals from transmission network NET2 can be separated and amplified separately by an appropriate choice of the cutoff frequencies of the high-pass and low-pass filters.

In the two amplifiers V1, V2, the two signals generated in the frequency filter unit FW2 are amplified separately and with different gains. The circuits of the amplifiers V1, V2 are less complex than the circuit of the broadband amplifier BV, since they have to amplify the signals in only a portion of the frequency band. The amplifiers V1 and V2 can thus be manufactured at low cost. After the amplification, the signals are fed to a further frequency filter unit FW1 having two inputs and one output, where the two differently amplified signals are combined. The combined signals are routed to a group of terminals. The construction and operation of the frequency filter unit FW1 corresponds to that of the frequency filter unit of FIG. 1, with the cutoff frequencies of the high-pass and low-pass filters being equal to those of the frequency filter unit FW2.

Figure 3:
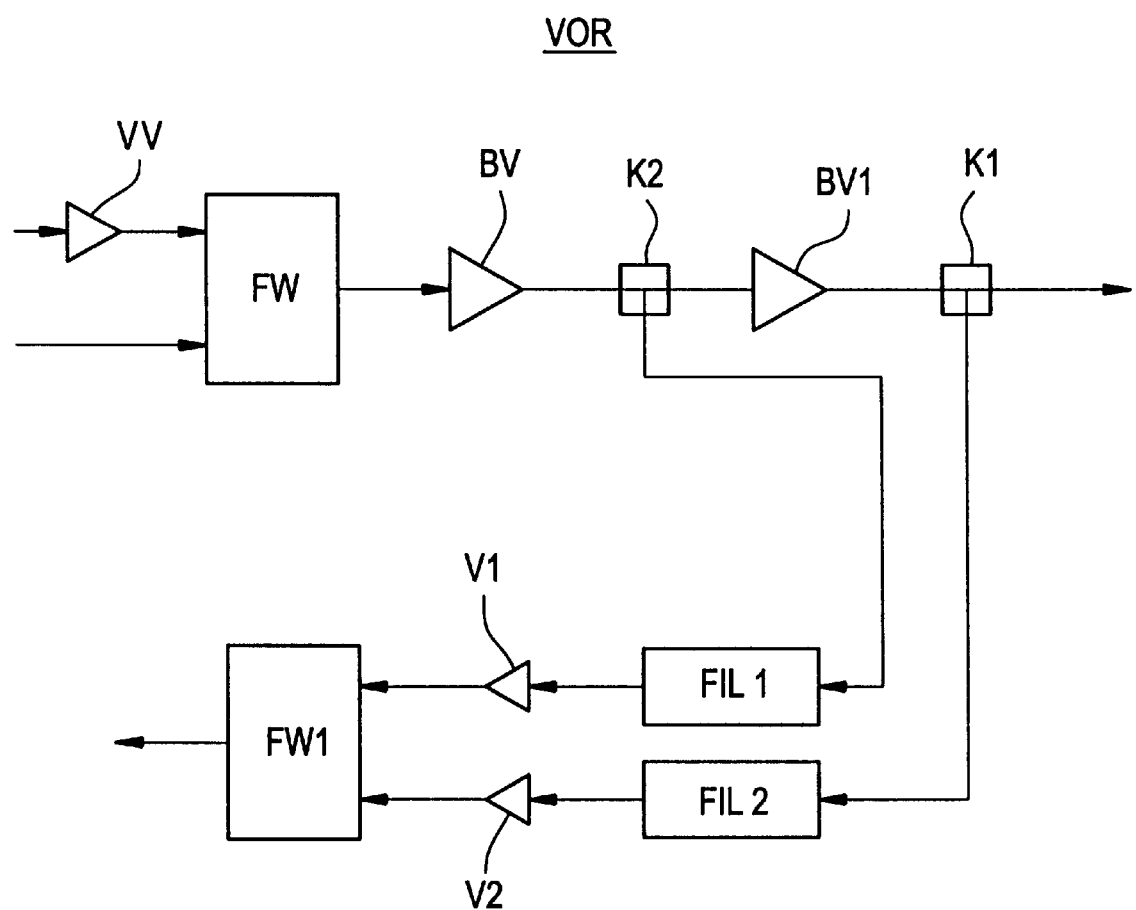
FIG. 3 is a schematic block diagram of a third embodiment of a facility in accordance with the invention.

The third embodiment will now be described with the aid of FIG. 3. FIG. 3 shows a facility VOR according to the invention which is identical in operation and construction to the facility of FIG. 2 except that instead of the frequency filter unit FW2, two filters FIL1, FIL2 and an additional asymmetrical directional coupler K2 are provided.

The two filters FIL1 and FIL2 are connected ahead of amplifiers V1 and V2, respectively, and they are connected in series with the broadband amplifiers BV and BV1, respectively, such that at least portions of the outputs of the broadband amplifiers BV and BV1 reach the filters FIL1 and FIL2, respectively.

The asymmetrical coupler K2 is inserted between broadband amplifier BV and broadband amplifier BV1 and routes a portion of the output of broadband amplifier BV to filter FIL1. Filter FIL2 receives its input signal from directional coupler K1. The cutoff frequencies of filters FIL1 and FIL2, which are, for example, a high-pass filter and a low-pass filter or two bandpass filters, can be chosen to meet the level requirements for, e.g., the separation into analog and digital signals as described in connection with FIG. 2. The cutoff frequencies of the frequency filter unit FW1 are then adapted to the cutoff frequencies chosen for the filters FIL1 and FIL2.

In the embodiments, the broadband amplifier BV1 and the asymmetrical couplers K1 and K2 can be dispensed with if, for example, the output signals of the facility are to be routed to only one group of terminals.

What is claimed is:

1. A facility (VOR) for combining and amplifying two broadband signals which are received from different transmission networks (NET1, NET2) and are transmitted in transmission channels separated in frequency, said facility comprising:

a preamplifier (VV) for amplifying one of the two received broadband signals such that the ratio of the level of said one received broadband signal to the level of the other received broadband signal assumes a predetermined value, a frequency filter unit (FW) having two inputs and one output for combining the two broadband signals, and a broadband amplifier (BV) following said frequency filter unit (FW) and suitable for amplifying the combined broadband signals.

2. A facility (VOR) as claimed in claim 1, characterized in that said one broadband signal occupies a frequency band above a predetermined cutoff frequency, said other broadband signal occupies a frequency band below a predetermined cutoff frequency, and the frequency filter unit (FW) contains a high-pass filter and a low-pass filter whose cutoff frequencies are chosen to minimize the transfer of interference from said one broadband signal into the frequency band occupied by the other broadband signal and vice versa.

3. A facility (VOR) as claimed in claim 1, further comprising:

at least one signal generator coupled to the output of the broadband amplifier (BV) and generating two signals with different, nonoverlapping frequency bands from at least a portion of the output of the broadband amplifier (BV), two amplifiers (V1, V2) for amplifying the two generated signals separately and with different gains, and a further frequency filter unit (FW1) having two inputs and one output and combining the two differently amplified signals.

4. A facility (VOR) as claimed in claim 3, characterized in that said signal generator is a frequency filter unit (FW2) having one input and two outputs, said two outputs being connected to one amplifier (V1, V2) each, and the frequency filter unit (FW2) is connected in series with the broadband amplifier (BV) such that at least a portion of the output of the broadband amplifier (BV) reaches the frequency filter unit (FW2).

5. A facility (VOR) as claimed in claim 3, characterized in that said signal generator comprises two filters (FIL1, FIL2) which are connected ahead of one amplifier (V1, V2) each and which are each connected in series with the broadband amplifier (BV) such that at least a portion of the output of the broadband amplifier (BV) reaches the respective filter (FIL1, FIL2).

6. A facility (VOR) as claimed in claim 3, characterized in that said signal generator is suitable for generating two signals whose frequency bands differ from the frequency bands of the transmission channels of the received signals.

7. A facility (VOR) as claimed in claim 1, characterized in that one (NET1) of the transmission networks (NET1, NET2) is an electric network and the other (NET2) an optical network.

8. A facility (VOR) as claimed in claim 7, characterized in that the electric network (NET1) is a cable television distribution network.

* * * * *